US012610432B2

(12) United States Patent
Howell et al.

(10) Patent No.: US 12,610,432 B2
(45) Date of Patent: Apr. 21, 2026

(54) SYSTEMS FOR TOUCH FOIL ALIGNMENT IN APPLIANCES

(71) Applicant: Haier US Appliance Solutions, Inc., Wilmington, DE (US)

(72) Inventors: Kyle Howell, Louisville, KY (US); John Adam Yantis, Prospect, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 623 days.

(21) Appl. No.: 18/169,749

(22) Filed: Feb. 15, 2023

(65) Prior Publication Data

US 2024/0276603 A1 Aug. 15, 2024

(51) Int. Cl.
*H05B 1/02* (2006.01)

(52) U.S. Cl.
CPC .................................. *H05B 1/0266* (2013.01)

(58) Field of Classification Search
CPC .................................................... H05B 1/0266
See application file for complete search history.

(56) References Cited

U.S. PATENT DOCUMENTS

| | | | | |
|---|---|---|---|---|
| 8,730,185 | B2 * | 5/2014 | Rudolph | F24C 7/083 345/173 |
| 9,410,907 | B2 * | 8/2016 | Tran | G01N 27/02 |
| 9,459,004 | B2 * | 10/2016 | Bach | F24C 7/083 |
| 9,528,696 | B2 * | 12/2016 | Bach | F21V 33/0044 |
| 9,709,284 | B2 * | 7/2017 | Bach | F24C 7/086 |
| 9,902,146 | B2 | 2/2018 | Gartner et al. | |
| 12,326,263 | B2 * | 6/2025 | Kozinski | G02B 6/0051 |

FOREIGN PATENT DOCUMENTS

| | | |
|---|---|---|
| WO | WO2016066381 A1 | 5/2016 |
| WO | WO2016008718 A1 | 6/2016 |
| WO | WO2018028949 A1 | 2/2018 |

* cited by examiner

*Primary Examiner* — Lorne E Meade
(74) *Attorney, Agent, or Firm* — Dority & Manning, P.A.

(57) ABSTRACT

A cooktop appliance includes a cooktop plate defining an upper cooking surface, and a plurality of heating elements. The cooktop appliance also includes a controller in operative communication with the plurality of heating elements, a user interface disposed on the cooktop plate, and a light guide positioned below the cooktop plate. The light guide includes a slot. The cooktop appliance also includes a touch foil positioned at the light guide. The touch foil includes a locator graphic positioned on a surface of the touch foil. The locator graphic aligns within the slot of the light guide.

20 Claims, 4 Drawing Sheets

SYSTEMS FOR TOUCH FOIL ALIGNMENT IN APPLIANCES

FIELD OF THE INVENTION

The present subject matter relates generally to cooktop appliances, and more particularly to systems for aligning touch foils in cooktop appliances.

BACKGROUND OF THE INVENTION

Cooktop appliances generally include heating elements for heating cooking utensils, such as pots, pans, and griddles. A variety of configurations can be used for the heating elements located on the cooking surface of the cooktop. The number of heating elements or positions available for heating on the range appliance can include, for example, four, six, or more depending upon the intended application and preferences of the buyer. These heating elements can vary in size, location, and capability across the appliance.

Some systems have attempted to incorporate LED lights in the control panel. Traditional cooktop appliances use mechanical locating features to align the LEDs with graphics on the cooktop surface. However, using mechanical features to align the LEDs presents a number of drawbacks. For instance, mechanical features can impact the appearance of the user interface through the cooktop, and there is a risk of blocking light, creating dead zones in the user interface, and impacting product visual quality/craftsmanship.

As a result, it would be useful to have an appliance or system to address one or more of the above issues. As an example, it would be advantageous to provide an appliance or system for aligning the LEDs with graphical features of the cooktop appliance without blocking light and impacting product visual quality/craftsmanship.

BRIEF DESCRIPTION OF THE INVENTION

Aspects and advantages of the invention will be set forth in part in the following description, or may be apparent from the description, or may be learned through practice of the invention.

In one example embodiment, a cooktop appliance includes a cooktop plate defining an upper cooking surface, and a plurality of heating elements. The cooktop appliance also includes a controller in operative communication with the plurality of heating elements, a user interface disposed on the cooktop plate, and a light guide positioned below the cooktop plate. The light guide includes a slot. The cooktop appliance also includes a touch foil positioned at the light guide. The touch foil includes a locator graphic positioned on a surface of the touch foil. The locator graphic aligns within the slot of the light guide.

In another example embodiment, a cooking appliance includes a heating element, a control panel, and a controller within the control panel. The controller is in operative communication with the heating element. A user interface is disposed at the control panel, and a light guide is positioned below the control panel. The light guide includes at least one slot. The cooking appliance also includes a touch foil positioned at the light guide. The touch foil includes a locator graphic positioned on a surface of the touch foil. The locator graphic aligns within the slot of the light guide.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
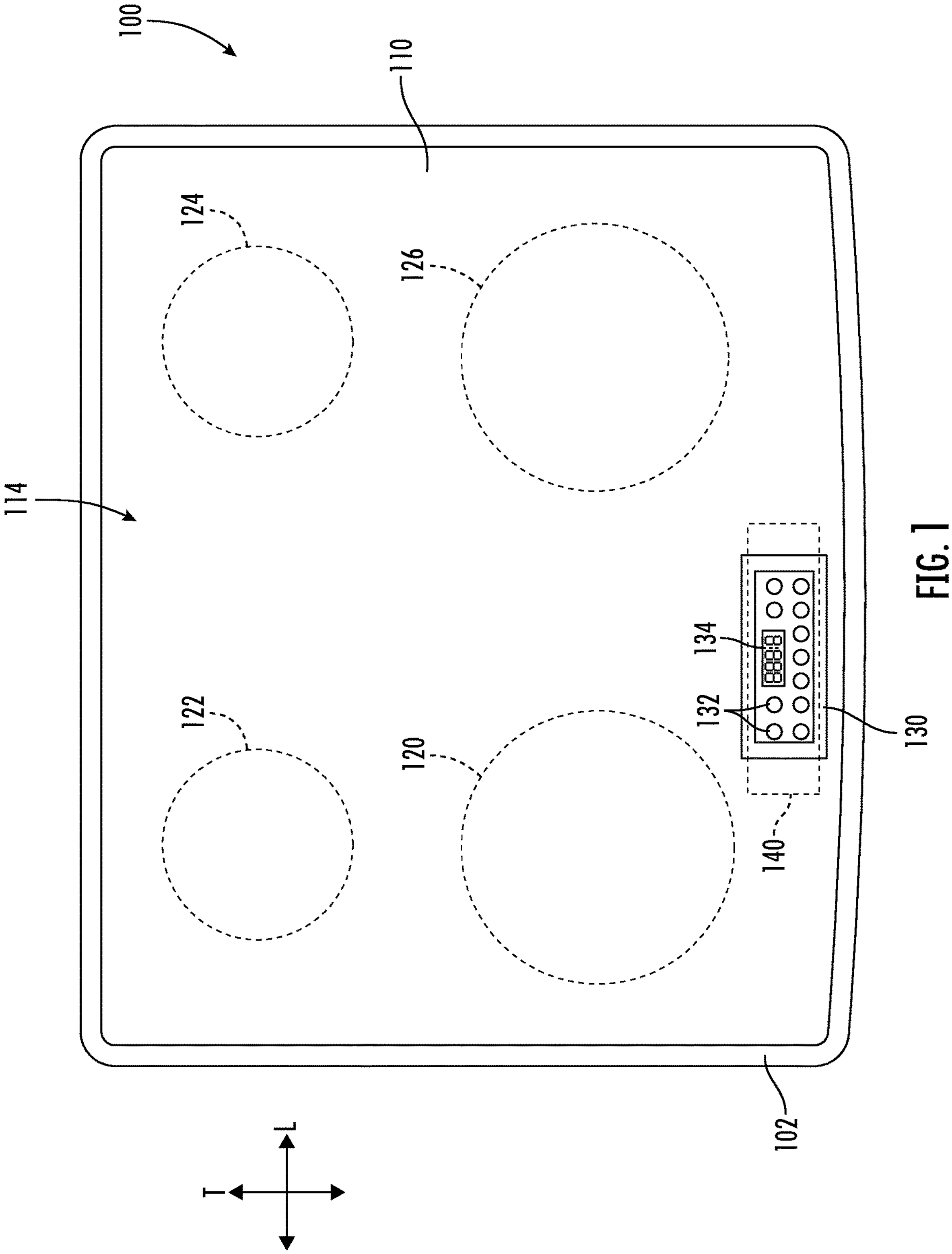
FIG. 1 provides a top, plan view of a cooktop appliance according to an example embodiment of the present disclosure.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction).

Turning now to the figures, FIG. 1 provides a top, plan view of a cooktop appliance 100 according to example embodiments of the present disclosure. Cooktop appliance 100 can be installed in various locations such as in cabinetry in a kitchen, with one or more ovens to form a range appliance, or as a standalone appliance. Thus, as used herein, the term "cooktop appliance" includes grill appliances, stove appliances, range appliances, and other appliances that incorporate cooktops.

According to example embodiments, cooktop appliance 100 may include a cabinet 102 that is generally configured for containing or supporting various components of appliance 100 and which may also define one or more internal chambers or compartments of appliance 100. In this regard, as used herein, the terms "cabinet," "housing," and the like are generally intended to refer to an outer frame or support structure for cooktop appliance 100, (e.g., including any suitable number, type, and configuration of support structures formed from any suitable materials, such as a system of elongated support members, a plurality of interconnected panels, or some combination thereof.) It should be appreciated that cabinet 102 does not necessarily require an enclosure and may simply include open structure supporting various elements of cooktop appliance 100. By contrast, cabinet 102 may enclose some or all portions of an interior of cabinet 102. It should be appreciated that cabinet 102 may have any suitable size, shape, and configuration while remaining within the scope of the present subject matter. While described with regards to cooktop appliance 100, one of skill in the art would understand the subject matter of the present disclosure may be applied to any suitable user interface of any suitable appliance, e.g., a range, an oven, etc.

Cabinet 102 generally defines a mutually orthogonal vertical, lateral, and transverse direction. Cabinet 102 extends between a top and a bottom along the vertical direction, between a first side (e.g., the left side when viewed from the front as in FIG. 1) and a second side (e.g., the right side when viewed from the front as in FIG. 1) along the lateral direction L, and between a front and a rear along the transverse direction T. In general, terms such as "left," "right," "front," "rear," "top," or "bottom" are used with reference to the perspective of a user accessing cooktop appliance 100.

Cooktop appliance 100 includes a cooktop plate 110 (e.g., mounted to cabinet 102) for supporting cooking utensils, such as pots or pans, on a cooking or top surface 114 of cooktop plate 110. Optionally, cooktop plate 110 may be fixed or secured to cabinet 102 at its perimeter edge (e.g., such that the sides or edges of cooktop plate 110 rest on a more rigid structure—or are otherwise prevented from deflected more than—a central portion of cooktop plate 110). When assembled, a top cooking surface 114 is directed vertically upward to contact cooking utensils, while a bottom interior surface is directed vertically downward opposite the top surface 114 (e.g., toward a support panel mounted below cooktop plate 110). Cooktop plate 110 may be any suitable rigid plate, such as one formed of ceramic or glass (e.g., glass ceramic). One or more burners or a plurality of heating assemblies 120, 122, 124, and 126 are mounted below cooktop plate 110 such that heating assemblies 120, 122, 124, and 126 are positioned below cooktop plate 110 (e.g., below a bottom interior surface along the vertical direction). Cooktop plate 110 may be continuous over heating assemblies 120, 122, 124, and 126. Thus, no holes may extend vertically through cooktop plate 110 above heating assemblies 120, 122, 124, and 126.

While shown with four heating assemblies 120, 122, 124, and 126 in the example embodiment of FIG. 1, cooktop appliance 100 may include any number of heating assemblies 120, 122, 124, and 126 in alternative embodiments. Heating assemblies 120, 122, 124, and 126 can also have various diameters. For example, each heating assembly of heating assemblies 120, 122, 124, and 126 can have a different diameter, the same diameter, or any suitable combination thereof. In addition, the heating assemblies 120, 122, 124, and 126 may include differing numbers or shapes of electric heating elements, as would be understood. Nonetheless, cooktop appliance 100 is provided by way of example only and is not limited to the example embodiment shown in FIG. 1. For example, a cooktop appliance having one or more radiant heating assemblies in combination with one or more electric resistance or gas burner heating elements can be provided. In addition, various combinations of number of heating assemblies, position of heating assemblies or size of heating assemblies can be provided.

Generally, a user interface 130 provides visual information to a user and allows a user to select various options for the operation of cooktop appliance 100. For example, displayed options can include a desired heating assemblies 120, 122, 124, and 126, a desired cooking temperature, or other options. User interface 130 can be any type of suitable input device and can have any suitable configuration. In FIG. 1, user interface 130 is located within a portion of cooktop plate 110. Alternatively, user interface 130 can be positioned on a vertical surface near a front side of cooktop appliance 100 or at another location that is convenient for a user to access during operation of cooktop appliance 100.

In some embodiments, such as that shown in FIG. 1, user interface 130 includes a capacitive touch screen input device component, or touch foil 132. Touch foil 132 may allow for the selective activation, adjustment or control of any or all heating assemblies 120, 122, 124, and 126 as well as any timer features or other user adjustable inputs. Touch foil 132 may be configured for triggering when a user touches a surface of user interface 130. Moreover, touch foil 132 can detect when a conductive material or any material with a dielectric different than air contacts or approaches surface of user interface 130 due to a change in the capacitance detected by touch foil 132. For instance, touch foil 132 can detect an increase in capacitance when the user touches the control panel. As an example, user interface 130 may be positioned at cooktop plate 110 such that the surface of user interface 130 faces outwardly. Touch foil 132 may signal a controller 140 (described in greater detail below) when a user touches or moves an appendage towards the surface of user interface 130 adjacent touch foil 132. In such a manner, operations of cooktop appliance 100 can be initiated and controlled via touch foil 132. One or more of a variety of electrical, mechanical, or electro-mechanical input devices including rotary dials, push buttons, toggle/rocker switches, or touch pads can also be used singularly or in combination with touch foil 132. User interface 130 also includes a display component 134, such as a digital or analog display device designed to provide operational feedback to a user.

Generally, cooktop appliance 100 includes a controller 140. Operation of cooktop appliance 100 may be regulated by controller 140. Controller 140 is operatively coupled or in communication with various components of cooktop appliance 100, including user interface 130. In response to user manipulation of the user interface 130, controller 140 operates the various components of cooktop appliance 100 to execute selected cycles and features.

Controller 140 may include memory (e.g., non-transitory media) and microprocessor, such as a general or special purpose microprocessor operable to execute programming instructions or micro-control code associated with a cleaning cycle. The memory may represent random access memory such as DRAM, or read only memory such as ROM or FLASH. In one embodiment, the processor executes programming instructions stored in memory. The memory may be a separate component from the processor or may be included onboard within the processor. Alternatively, controller 140 may be constructed without using a microprocessor (e.g., using a combination of discrete analog or digital logic circuitry, such as switches, amplifiers, integrators, comparators, flip-flops, AND gates, and the like) to perform control functionality instead of relying upon software. Heating assemblies (e.g., 120, 124, 122, or 126), user interface 130 and other components of cooktop appliance 100 may be in communication with controller 140 via one or more signal lines or shared communication busses.

Figure 2:
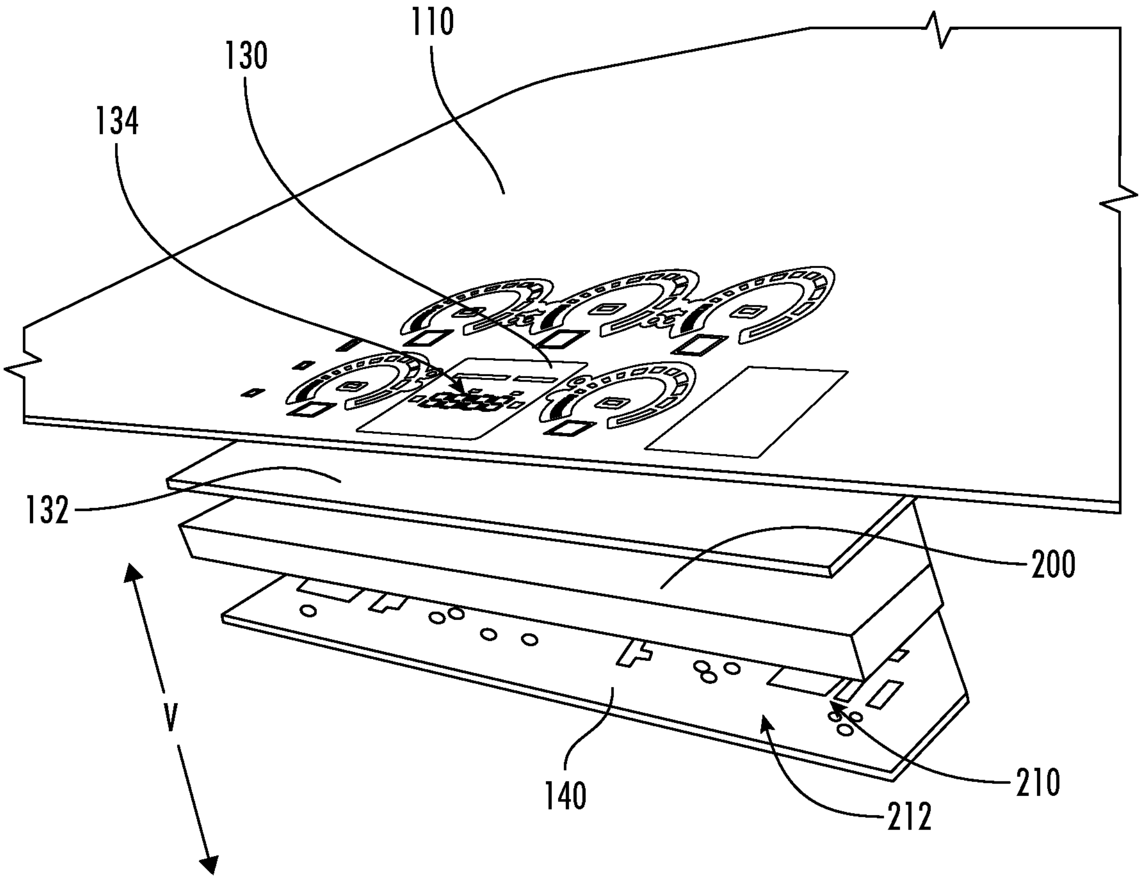
FIG. 2 provides a perspective view of an example user interface of the cooktop appliance of FIG. 1 according to aspects of the present disclosure.

As may be seen in FIG. 2, user interface 130, also referred to as a control panel, may include various components beneath, e.g., in the vertical direction V, cooktop plate 110. For example, beneath user interface 130 of cooktop plate 110 may be a touch foil 132, a light guide 200, and controller 140. In some example embodiments, the circuit board, or controller 140, may be configured with light emitting diodes (LEDs) 210 on a top surface 212 of controller 140. In general, LEDs 210 may be positioned and oriented to emit light through light guide 200, then through touch foil 132, and further through cooktop plate 110 so as to be visible to a user. Light guide 200 may be generally configured to direct light from LEDs 210 into specific patterns or graphics on cooktop plate 110. For example, LEDs 210 may be configured to emit light through light guide 200 in order to illuminate one or both of control graphics, e.g., control dials or buttons, and informational graphics, e.g., temperature values or timer values. Generally, touch foil 132 may be configured for operative communication with controller 140. In some example embodiments, touch foil 132 may be pressed and adhered to light guide 200. In general, controller 140 may be configured to operate LEDs 210 in response to user interaction with touch foil 132, such that LEDs 210 may provide illuminated control graphics and/or informational graphics.

Figure 3:
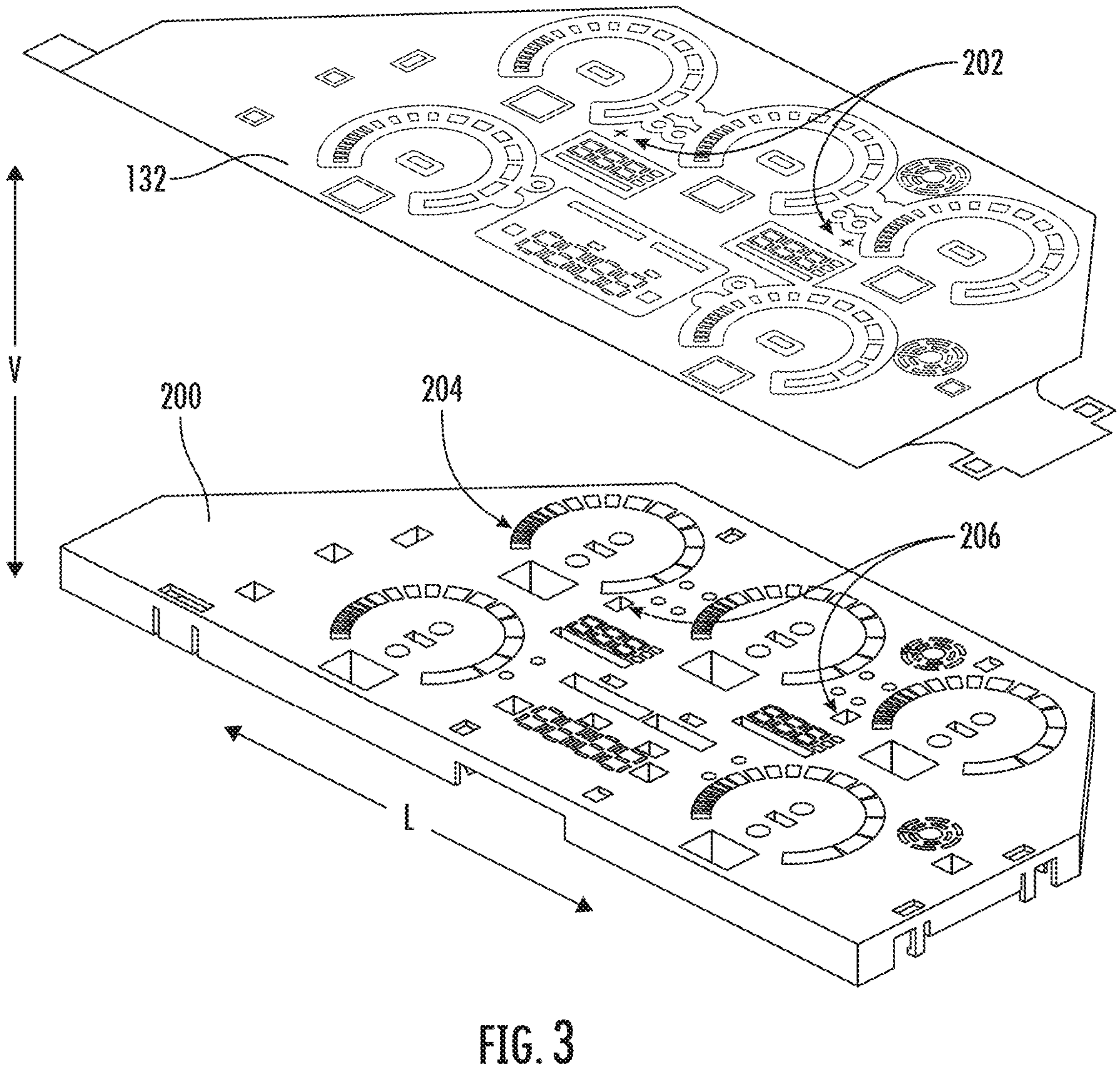
FIG. 3 provides a perspective view of a touch foil and a light guide of the example user interface of FIG. 2 according to aspects of the present disclosure.

FIG. 3 illustrates touch foil 132 and light guide 200 prior to assembly below user interface 130. As stated above, light guide 200 may be generally configured to direct light from LEDs 210 into specific patterns or graphics on cooktop plate 110. Specifically, light guide 200 may include a plurality of light slots 204. Generally, light slots 204 may be tapered or shaped to precisely direct light from LEDs 210. Light guide 200 may also include one or more slots 206 generally configured for aligning touch foil 132 on light guide 200. In the present example embodiment, slot 206 may be oriented parallel with respect to the vertical direction V, and/or, e.g., slot 206 may not be tapered like light slots 204. For example, touch foil 132 may include one or more locator graphics 202 printed onto the touch foil 132 and generally configured to align with the slot 206 of light guide 200 in order to suitably position touch foil 132 relative to light guide 200. Generally, locator graphic 202 may be one of a symbol, a polygonal shape, and alphanumeric. For example, locator graphic 202 may be a crosshair, a star, a 'T', etc. One of skill in the art would understand these are provided by way of example only, and locator graphic 202 may be any suitable symbol, polygonal shape, or alphanumeric. In other example embodiments, the slot 206 of light guide 200 may be one of a plurality of slots 206 in light guide 200, and the locator graphic 202 of touch foil 132 may be one of a plurality of locator graphics 202 on touch foil 132. Thus, e.g., each of the plurality of locator graphics 202 may be positioned at and aligned with a respective one of the plurality of slots 206 of light guide 200 in order to suitably position touch foil 132 relative to light guide 200.

Figure 4:
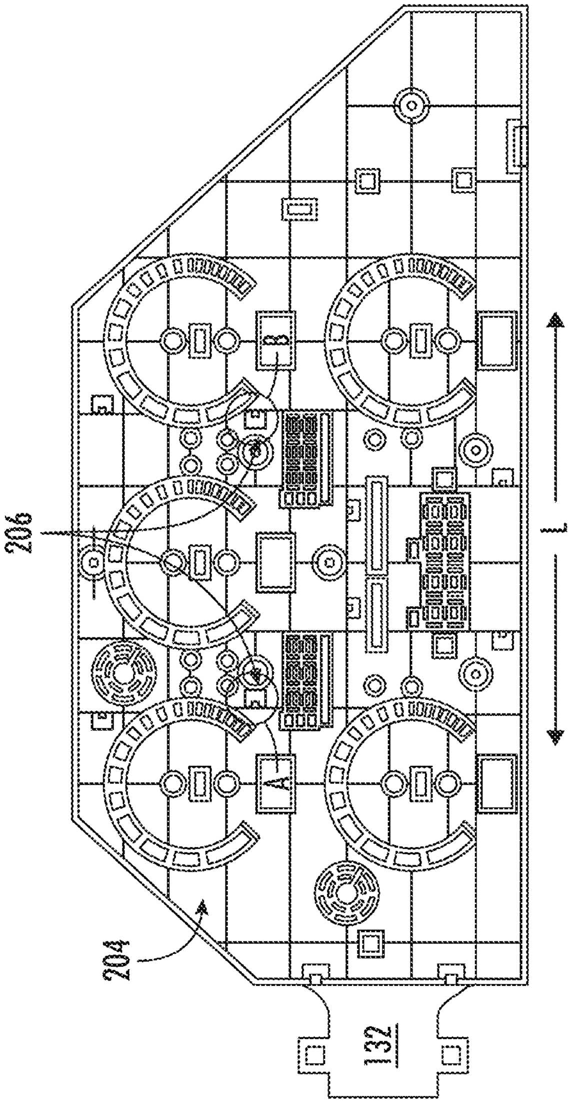
FIG. 4 provides a bottom view of the light guide of FIG. 3 according to aspects of the present disclosure.
Figure 4A:
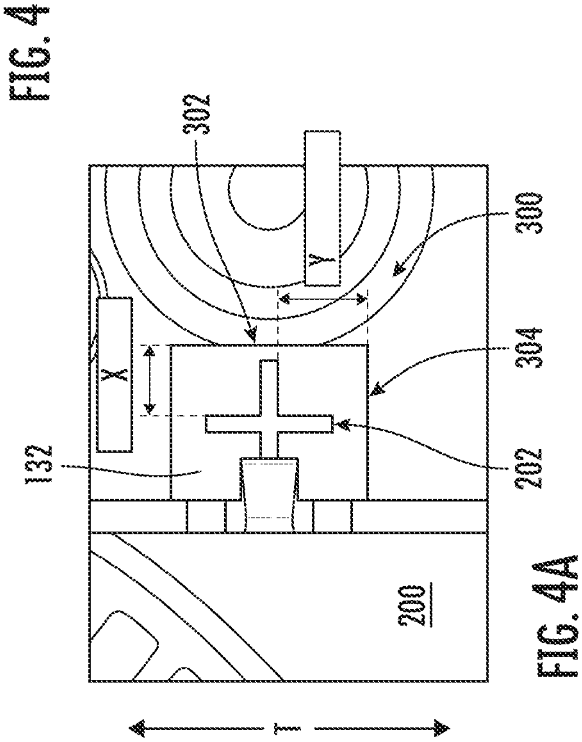
FIG. 4A and FIG. 4B provide detailed views of slots in the light guide of FIG. 4.
Figure 4B:
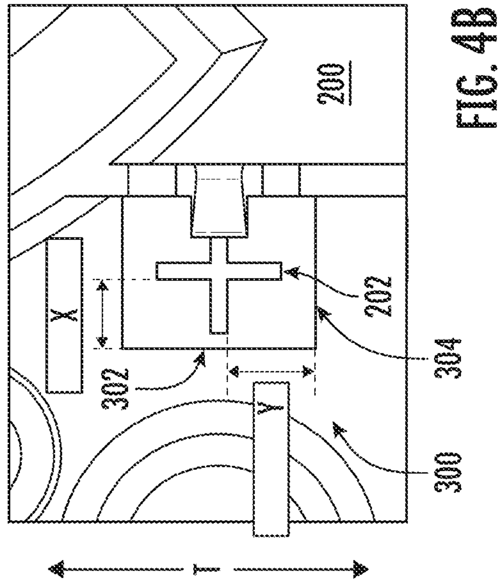

FIG. 4 illustrates a bottom view of light guide 200, and FIGS. 4A and 4B illustrate detailed views of slots 206 in light guide 200. As shown in FIGS. 4, 4A, and 4B, locator graphic is shown as a crosshair. Generally, in order to align touch foil 132 with light guide 200, a distance, X and Y, between slot 206 and locator graphic 202 is measurable for positioning.

Measurements X and Y may be performed with an optical alignment system (OAS), optical comparator, or projection camera measurement system. Measurement X may be between locator graphic 202 and a side edge 302 of slot 206. Similarly, measurement Y may be between locator graphic 202 and a bottom edge 304 of slot 206. For example, in the present example embodiment, measurement X may be about two millimeters (2 mm) and measurement Y may be about three millimeters (3 mm). As stated above, values modified by a term or terms, such as "generally," "about," "approximately," and "substantially," are not to be limited to the precise value specified and are provided by way of example only. Aligning locator graphics 202 of touch foil 132 with slots 206 of light guide 200 within appropriate measurements X and Y may properly align touch foil 132 with light guide 200 without blocking light and/or impacting product visual quality/craftsmanship. Side edge 302 of slot 206 and bottom edge 304 of slot 206 may be oriented perpendicular to each other in certain example embodiments, e.g., to facilitate alignment of touch foil 132 and light guide 200 in two orthogonal directions.

In order to ensure visual quality/craftsmanship, locator graphic 202 may be positioned at a dead-zone portion 300 of light guide 200 relative to touch foil 132. Dead-zone portion 300 may be any suitable portion of light guide 200 where there are no LEDs 210 of controller 140 emitting light. As such, dead-zone portions 300, as shown in FIGS. 4A and 4B, may be backlit during assembly, in order to ease assembly, but post-assembly, locator graphics 202 may be invisible, or hidden, to a user of cooktop appliance 100.

As may be seen from the above, a cooktop appliance includes a user interface with a touch foil and a light guide. The touch foil may have a locator graphic configured to align with a slot in the light guide. Measuring these features permits for confirmation of acceptable placement of the touch foil to light guide without the need for physical, e.g., mechanical, locating features or impacting the appearance of the user interface through the cooktop glass. As such, the proper alignment of the locator graphic in the slot aligns touch foil with light guide without blocking light and/or impacting product visual quality/craftsmanship.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooktop appliance, comprising:
- a cooktop plate defining an upper cooking surface;
- a plurality of heating element mounted below the cooktop plate;
- a controller in operative communication with the plurality of heating element;
- a user interface disposed on the cooktop plate;
- a light guide positioned below the cooktop plate, the light guide comprising a slot; and
- a touch foil positioned at the light guide, the touch foil comprising
  - a locator graphic positioned on a surface of the touch foil, the locator graphic aligned within the slot of the light guide.

2. The cooktop appliance of claim 1, wherein the locator graphic is one of a symbol, polygonal shape, and alphanumeric.

3. The cooking appliance of claim 1, wherein a distance between one or more edges of the slot and the locator graphic is measurable for positioning the touch foil relative to the light guide.

4. The cooking appliance of claim 1, wherein the slot of the light guide is one of a plurality of slots in the light guide, the locator graphic of the touch foil is one of a plurality of locator graphics on the touch foil.

5. The cooking appliance of claim 4, wherein each of the locator graphics is aligned within a respective one of the plurality of slots of the light guide.

6. The cooking appliance of claim 1, wherein the touch foil is pressed and adhered to the light guide.

7. The cooking appliance of claim 1, wherein the locator graphic is positioned at a dead-zone portion of the light guide relative to the touch foil.

8. The cooking appliance of claim 1, wherein the controller is positioned below the light guide, the controller comprising a plurality of light emitting diodes, LEDs, positioned at a top surface of the controller.

9. The cooking appliance of claim 8, wherein the touch foil is in operative communication with the controller.

10. The cooking appliance of claim 8, wherein the LEDs are operable to emit light through the light guide to illuminate one or both of control graphics and informational graphics on the touch foil.

11. A cooking appliance, comprising:
- a heating element;
- a control panel;
- a controller within the control panel, the controller in operative communication with the heating element;
- a user interface disposed at the control panel;
- a light guide positioned below the control panel, the light guide comprising at least one slot; and
- a touch foil positioned at the light guide, the touch foil comprising,
  - at least one locator graphic positioned on a surface of the touch foil, the at least one locator graphic aligned within the at least one slot of the light guide.

12. The cooking appliance of claim 11, wherein the locator graphic is one of a symbol, polygonal shape, and alphanumeric.

13. The cooking appliance of claim 11, wherein a distance between one or more edges of the slot and the locator graphic is measurable for positioning the touch foil relative to the light guide.

14. The cooking appliance of claim 11, wherein the slot of the light guide is one of a plurality of slots in the light guide, the locator graphic of the touch foil is one of a plurality of locator graphics on the touch foil.

15. The cooking appliance of claim 14, wherein each of the locator graphics is aligned within a respective one of the plurality of slots of the light guide.

16. The cooking appliance of claim 11, wherein the touch foil is pressed and adhered to the light guide.

17. The cooking appliance of claim 11, wherein the locator graphic is positioned at a dead-zone portion of the light guide relative to the touch foil.

18. The cooking appliance of claim 11, wherein the controller is positioned below the light guide, the controller comprising a plurality of light emitting diodes, LEDs, positioned at a top surface of the controller.

19. The cooking appliance of claim 18, wherein the touch foil is in operative communication with the controller.

20. The cooking appliance of claim 18, wherein the LEDs are operable to emit light through the light guide to illuminate one or both of control graphics and informational graphics on the touch foil.

* * * * *